United States Patent
White et al.

(10) Patent No.: US 8,863,189 B2
(45) Date of Patent: Oct. 14, 2014

(54) SYSTEM FOR CONFIGURING SOFT KEYS IN A MEDIA COMMUNICATION SYSTEM

(75) Inventors: Scott White, Austin, TX (US); James L. Cansler, Pflugerville, TX (US); Brett Anderson, Fair Oaks Ranch, TX (US)

(73) Assignee: AT&T Intellectual Properties I, LP, Atlanta, GA (US)

(\*) Notice: Subject to any disclaimer, the term of this patent is extended or adjusted under 35 U.S.C. 154(b) by 940 days.

(21) Appl. No.: 12/033,084

(22) Filed: Feb. 19, 2008

(65) Prior Publication Data

US 2009/0210922 A1 Aug. 20, 2009

(51) Int. Cl.
*H04N 7/173* (2011.01)
*H04N 21/422* (2011.01)
*H04N 21/61* (2011.01)
*H04N 21/482* (2011.01)
*H04N 21/658* (2011.01)
*H04N 21/485* (2011.01)

(52) U.S. Cl.
CPC ..... *H04N 7/17354* (2013.01); *H04N 21/42204* (2013.01); *H04N 21/6125* (2013.01); *H04N 21/482* (2013.01); *H04N 21/6581* (2013.01); *H04N 7/17318* (2013.01); *H04N 21/485* (2013.01)
USPC .............. 725/46; 725/43; 715/745; 715/789

(58) Field of Classification Search
USPC .......................................................... 725/46
See application file for complete search history.

(56) References Cited

U.S. PATENT DOCUMENTS

| | | | |
|---|---|---|---|
| 6,114,978 A * | 9/2000 | Hoag | 341/23 |
| 6,567,984 B1 * | 5/2003 | Allport | 725/110 |
| 6,690,392 B1 * | 2/2004 | Wugoski | 715/744 |
| 6,842,877 B2 * | 1/2005 | Robarts et al. | 715/708 |
| 7,130,894 B2 | 10/2006 | Smethers | |
| 7,134,094 B2 * | 11/2006 | Stabb et al. | 715/827 |
| 7,281,214 B2 * | 10/2007 | Fadell | 715/745 |
| 7,319,743 B1 | 1/2008 | Dunlap | |
| 7,469,386 B2 * | 12/2008 | Bear et al. | 715/771 |
| 7,607,156 B2 * | 10/2009 | Shintani et al. | 725/80 |
| 8,732,748 B2 * | 5/2014 | de la Serna | 725/38 |
| 2002/0013950 A1 * | 1/2002 | Tomsen | 725/109 |
| 2002/0053084 A1 * | 5/2002 | Escobar et al. | 725/47 |
| 2002/0152462 A1 * | 10/2002 | Hoch et al. | 725/37 |
| 2004/0117331 A1 * | 6/2004 | Lutnick et al. | 705/416 |
| 2004/0261110 A1 * | 12/2004 | Kolbeck et al. | 725/78 |
| 2005/0028208 A1 * | 2/2005 | Ellis et al. | 725/58 |
| 2005/0055716 A1 * | 3/2005 | Louie et al. | 725/58 |
| 2005/0283810 A1 * | 12/2005 | Ellis et al. | 725/93 |
| 2006/0172267 A1 * | 8/2006 | Roell | 434/118 |
| 2009/0070809 A1 * | 3/2009 | Kendall et al. | 725/39 |
| 2014/0123049 A1 * | 5/2014 | Buxton et al. | 715/773 |

\* cited by examiner

*Primary Examiner* — Fernando Alcon
(74) *Attorney, Agent, or Firm* — Guntin & Gust, PLC; Andrew Gust

(57) ABSTRACT

A system that incorporates teachings of the present disclosure may include, for example, set top box (STB) having a controller to record one or more soft key preferences associated with a user of the STB for each of a plurality of media presentation states of a media communication system, receive a request for presentation of a graphical user interface (GUI) associated with one of the media presentation states, select one or more soft keys according to the one or more soft key preferences assigned to the requested media presentation state, and present the selected one or more soft keys in the GUI. Other embodiments are disclosed.

21 Claims, 8 Drawing Sheets

200

300

500

SYSTEM FOR CONFIGURING SOFT KEYS IN A MEDIA COMMUNICATION SYSTEM

FIELD OF THE DISCLOSURE

The present disclosure relates generally to soft key configuration techniques and more specifically to a system for configuring soft keys in a media communication system.

BACKGROUND

Media communication systems such as an Internet Protocol Television (TV) communication system, a cable TV communication system, or a satellite TV communication system present users with a variety of selectable soft key buttons to assist the user in navigating through graphical user interfaces (GUIs). Typically, a service provider of the media communication system predefines the soft key buttons for each GUI and chooses a function for each soft key that is contextually relevant to the content presented in the GUI.

DETAILED DESCRIPTION

One embodiment of the present disclosure entails a set top box (STB) having a controller to record one or more soft key preferences associated with a user of the STB for each of a plurality of media presentation states of a media communication system, receive a request for presentation of a graphical user interface (GUI) associated with one of the media presentation states, select one or more soft keys according to the one or more soft key preferences assigned to the requested media presentation state, and present the selected one or more soft keys in the GUI.

Another embodiment of the present disclosure entails a computer-readable storage medium in a media processor having computer instructions to receive a request for presentation of a GUI associated with one of a plurality of media presentation states of a media communication system, select one or more soft keys according to one or more soft key preferences associated with a user of the media processor and assigned to the requested media presentation state, and present the selected one or more soft keys in the GUI.

Yet another embodiment of the present disclosure entails a remote controller that manages operations of a media processor having a controller to present one or more soft keys selected according to one or more soft key preferences associated with a user of the media processor and assigned to each of a plurality of media presentation states of a media communication system.

Figure 1:
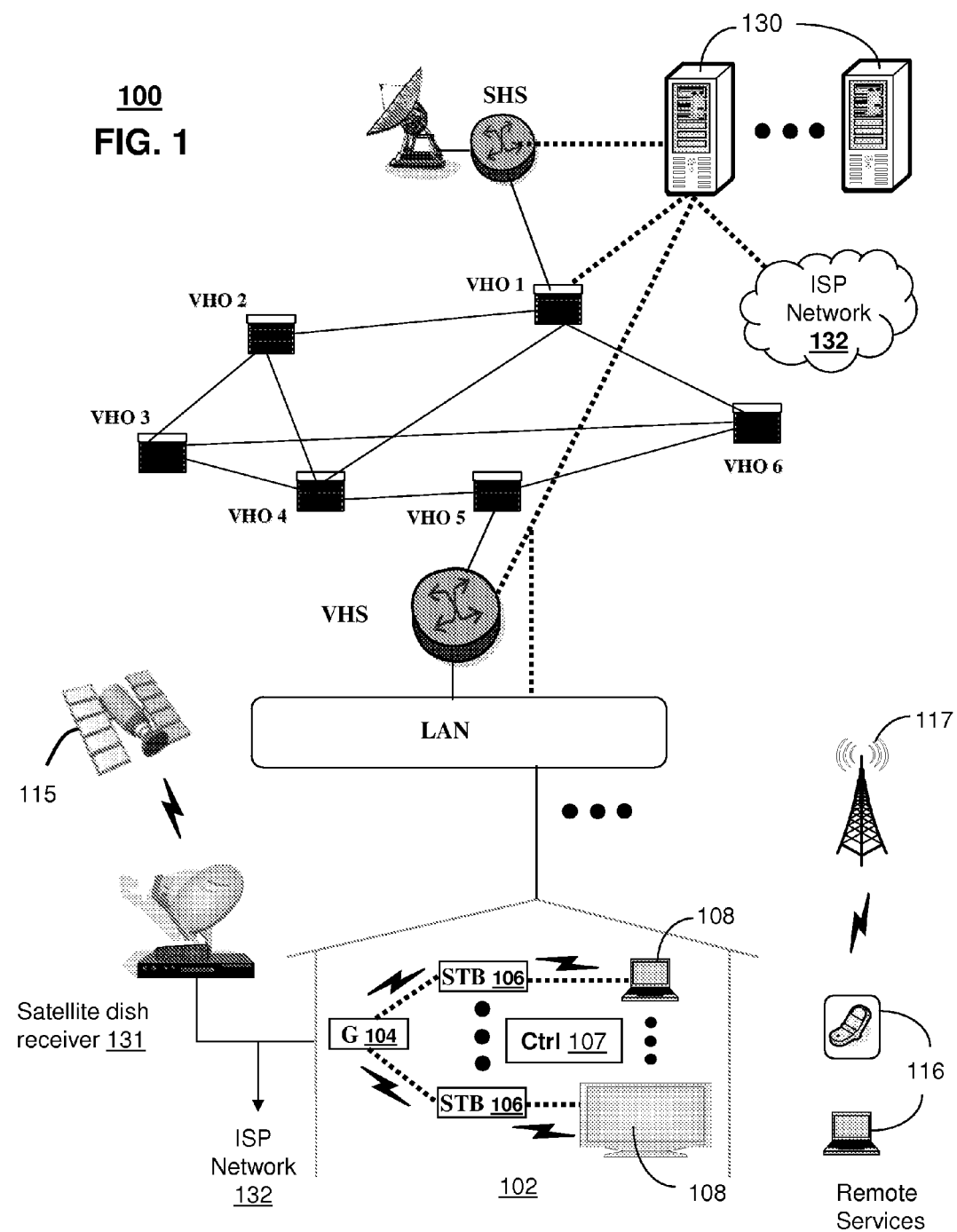
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
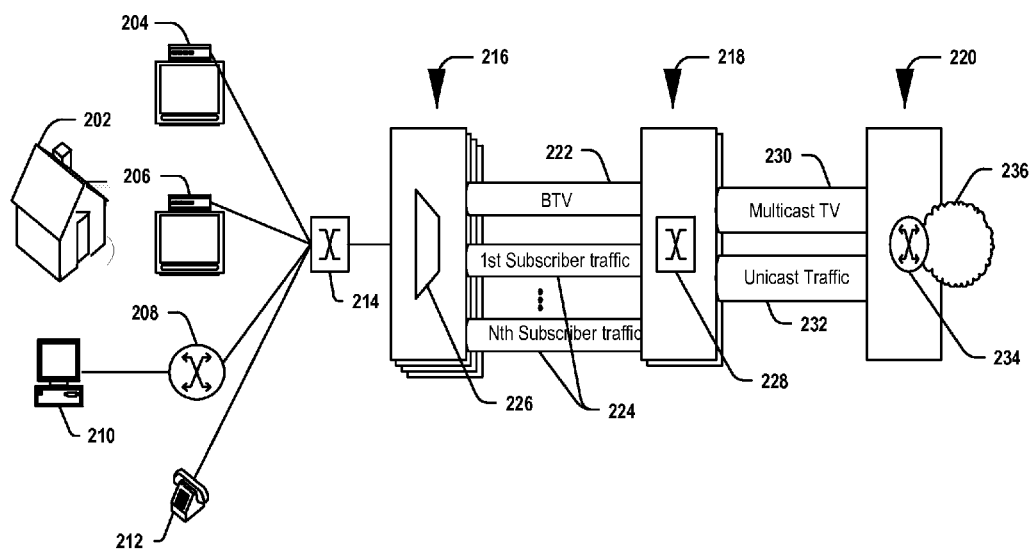

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
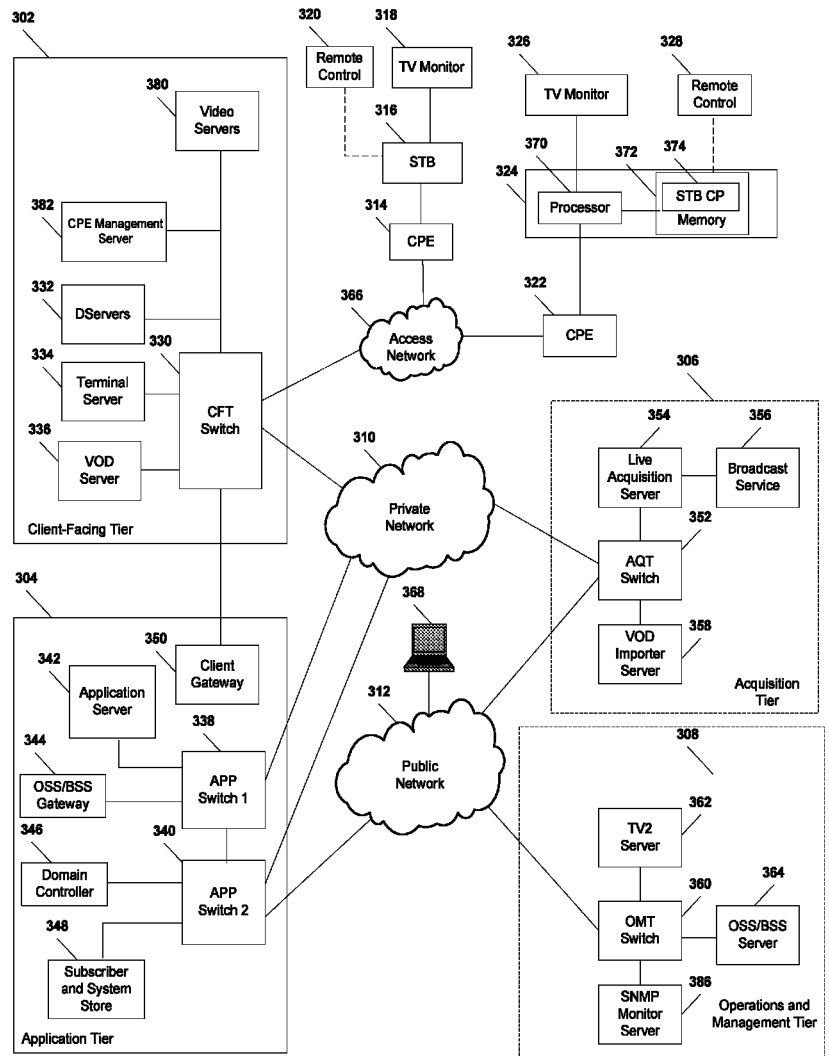

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
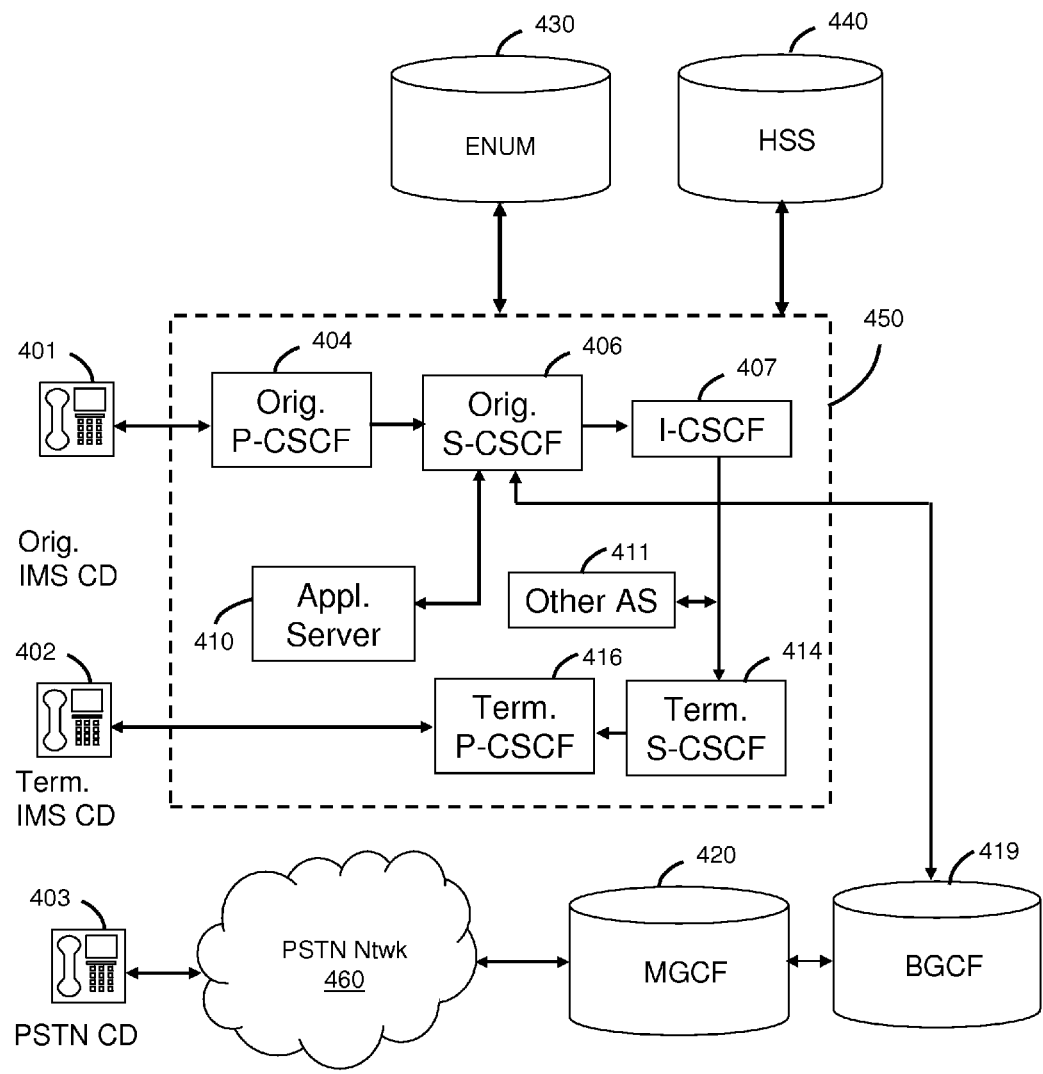

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
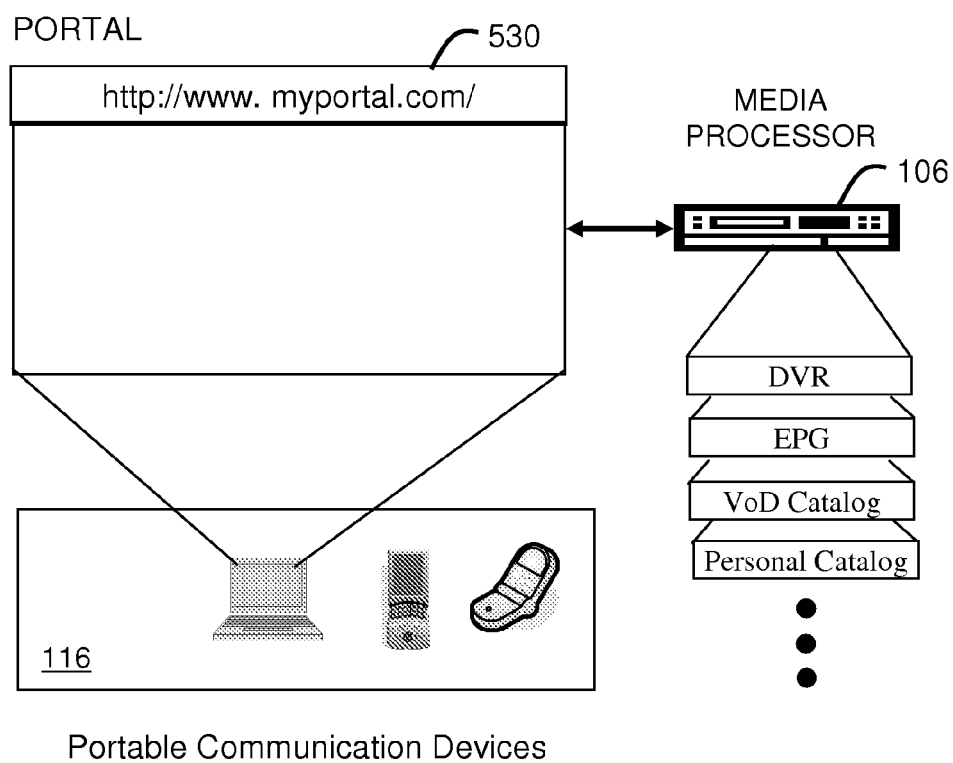
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
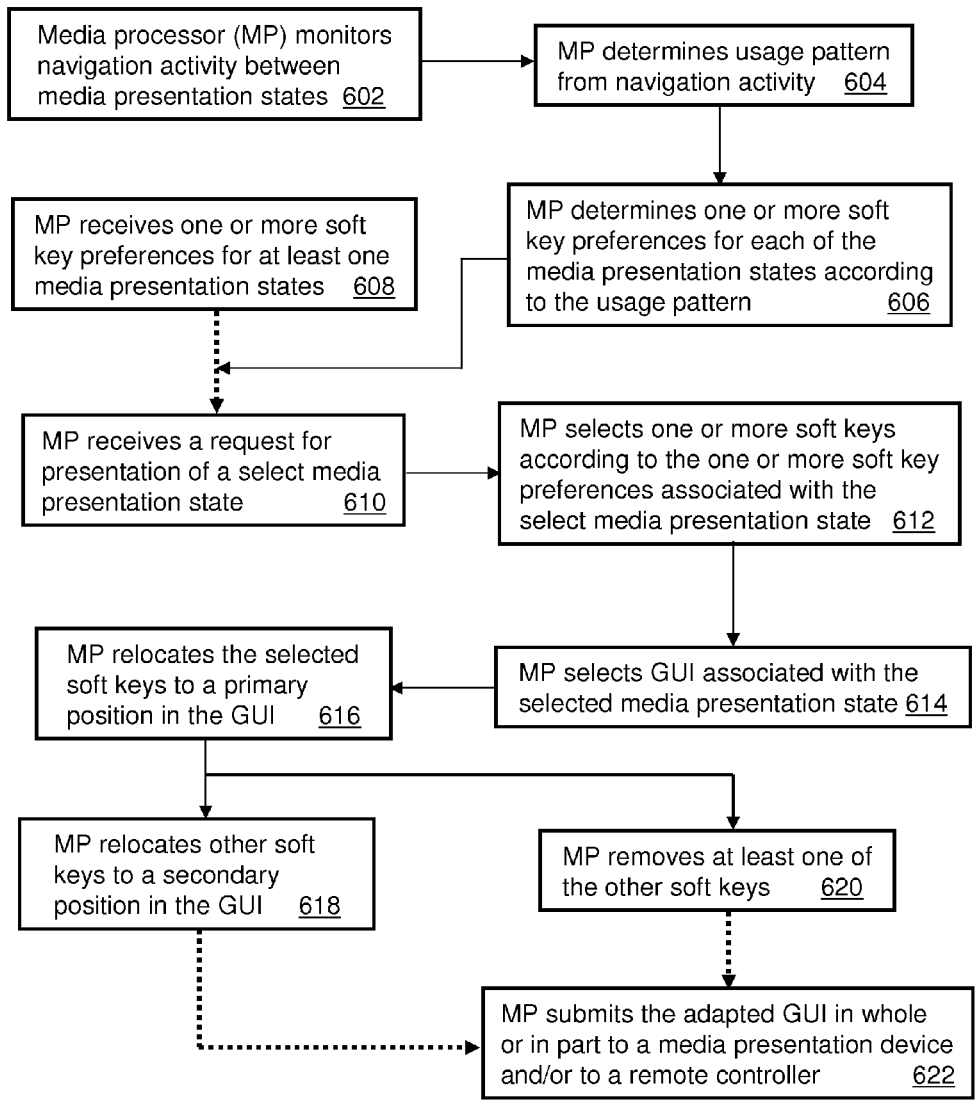
FIG. 6 depicts an exemplary method operating in portions of the communication systems of FIGS. 1-4.

FIG. 6 depicts an exemplary method 600 operating in portions of communication systems 100-400. Method 600 illustrates one of several embodiments for selecting soft keys for each of a plurality of media presentation states of the media communication systems of FIGS. 1-4. A media presentation state can represent a graphical user interface (GUI) with one or more selectable soft keys for managing media content presented by the media communication systems disclosed above. The GUI can be presented at a media presentation device such as a TV or laptop as shown in FIG. 1, or any other suitable computing device with visual presentation capabilities. The GUI can also be presented in whole or in part at a remote controller 107 that wirelessly controls operations of media processor such as an STB that manages presentations at the media presentation device. In yet another illustrative embodiment, the GUI can be presented in part at a media presentation device, and in part at the remote controller. In this embodiment, soft keys can be shown in the remote controller while the rest of the media presentation state can be presented at a GUI shown at the media presentation device.

Media presentation state GUIs with selectable soft keys can be used to present an EPG, a media program supplied by the media communication system (such as a TV program), a catalog of selectable media content such as a VoD catalog, a user's guide for managing operations of the STB or media content supplied by the media communication system invoked by a help button, a media content library of a user of the STB storing media content such as music, video, pictures, etc., a DVR menu, a portal associated with the STB, or combinations thereof. Generally speaking, media presentation states can represent any possible state of navigation or navigation pane supported by the media communication system and its network elements.

Figure 7:
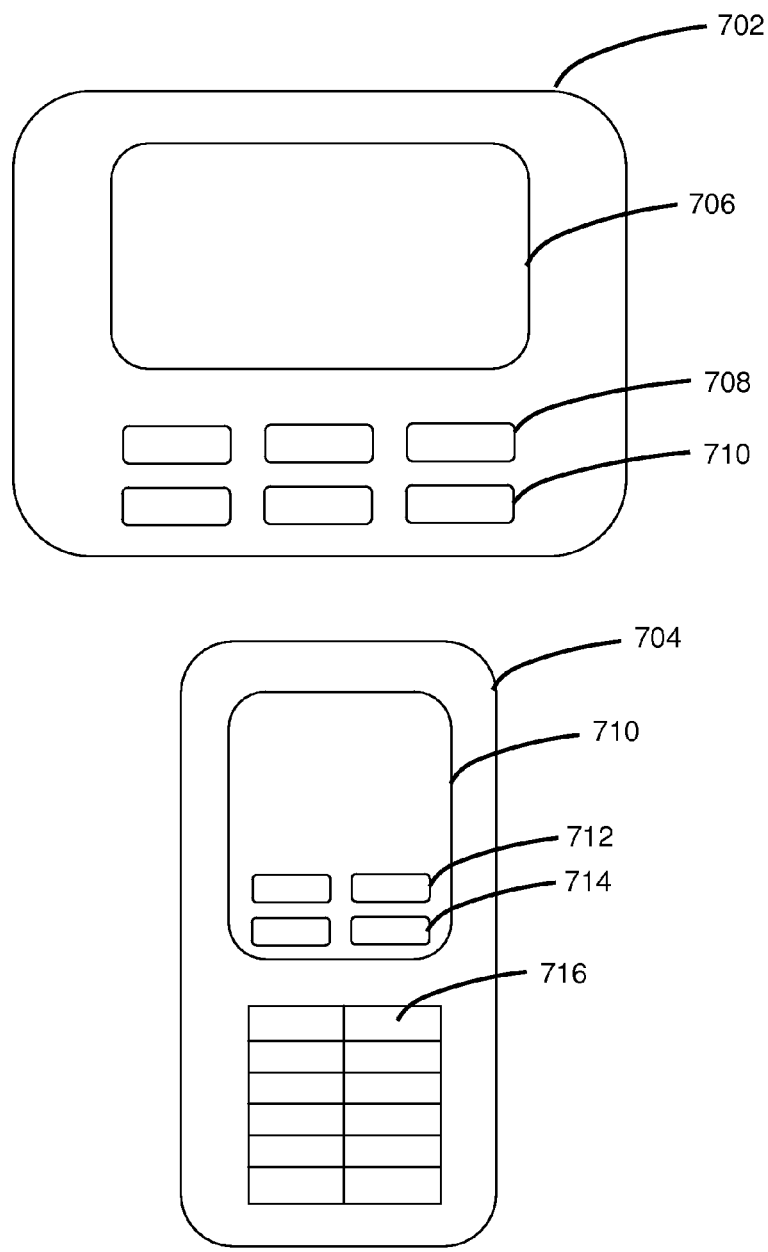
FIG. 7 depicts exemplary embodiments of soft key presentations in accordance with the method of FIG. 6.

FIG. 7 illustrates a media presentation device 702 such as a TV or computing device, and a remote controller 704. In these illustrations the media presentation device 702 can have a large display for presenting media content such as in window 706, and selectable soft keys 708, 710. The remote controller 704 can have a key pad 716, and a display 710 with selectable soft keys 712, 714. The selectable soft keys of the media presentation device 702 and/or remote controller 704 can be managed by the steps of method 600.

With these principles in mind, method 600 begins with step 602 in which a media processor (MP) such as an STB monitors navigation activity in each of the media presentation states invoked by the STB by a user. The MP can monitor for example a user's navigation activity with a VoD catalog, an EPG, a DVR, portal 530, media program channel selections, selecting a help menu from any contextual GUI, and so on. The navigation activity monitored can also include monitoring the selection of soft keys in the GUI of each navigation pane of a select media presentation state.

From the navigation activity, the MP can be directed to determine in step 604 utilizing common pattern recognition techniques (e.g., frequency of use, correlation, linear regression, etc.) to identify a usage pattern for each media presentation state invoked by the user. From the usage patterns, the MP can determine in step 606 one or more soft key preferences for each of the media presentation states. The soft key preferences can identify one or more soft keys which the user of the MP is mostly like to use while navigating a particular media presentation state. The soft key preferences can also identify which soft keys are unlikely to be used in each media presentation state.

In another illustrative embodiment, the user of the MP can supply in step 608 one or more soft key preferences for at least one of the media presentation states. In this embodiment, the user can define for example preferred soft keys, or soft key macros. A soft key macro can represent a combination of functions that manage operations within a select one of the media presentation states. Some users for example may want to perform a transaction based on selecting a single soft key rather than a sequence of soft keys to produce the same result.

Some service providers of media communication systems can require two selections to purchase media content from a VoD catalog, e.g., selection of a "Buy" button followed by selection of a "Confirm" button. The user of the MP can choose to consolidate these two soft key buttons into a macro that performs both functions in a single soft key, which the user can name as desired. The MP can be programmed to present in each media presentation state a soft key (e.g., "Customize Soft Keys") which the user can select to rearrange, delete, add, and/or customize soft keys.

When customization is requested, the MP can be programmed to present a customization GUI that shows the soft keys of the present media presentation state with options to delete, reposition, or modify functions of any one of the soft keys. The customization GUI can also provide the option to add new soft keys which can be defined in macro format using any macro technique such as Boolean logic. Referring back the example above, the customization GUI can provide an option to combine soft key buttons, e.g., "Buy"+"Confirm", which the user can name as "Purchase". The user can also utilize the same name as an existing soft key if the existing soft key is removed.

In an illustrative embodiment, steps 606 and 608 can be combined. That is, the MP can be directed to automatically define soft key preferences according to detected use patterns, while at the same time providing for user-defined soft keys as directed by a user of the MP. Steps 602-606 can operate as a background process that updates GUIs of the media communication system while a user of the MP navigates media presentation states.

In step 610, the MP can receive a request to present a select media presentation state responsive to navigation activity of the user of the MP (e.g., the user can request a presentation of the EPG). In step 612, the MP can select one or more soft keys according to the one or more soft key preferences associated with the select media presentation state. Once the soft keys are selected, the MP can select a GUI in step 614 associated with the selected media presentation state. In steps 616 and 618 the MP can relocate in the GUI the soft keys selected in step 612 to a primary position so that preferred soft keys have a prominent position over other soft keys which are considered less preferable by the user.

For example in FIG. 7 the soft keys shown as reference 708 of the media presentation device 702 have a more prominent position than the soft keys shown as reference 710. This is because soft keys in a first row generally catch the initial attention of a user of the MP over soft keys in subsequent rows. Similar statements can be made of the soft keys presented by the remote controller 704 as references 712 (primary soft keys), and 714 (secondary soft keys). The MP can also remove in step 620 soft keys as directed by the user of the MP or based on automatically generated soft key preferences determined from the usage patterns detected in step 606.

Once the soft key selection and presentation arrangement has been adapted in the GUI selected in step 614, the MP proceeds to step 622 where it presents the adapted GUI in whole or in part in a select media presentation device being used by the user of the MP at the time (e.g., a TV set), and/or a remote controller managing operations of the media presentation device. For remote controllers with no visual presentation capability, the MP can present the adapted GUI only at the media presentation device. In situations where the remote controller can display a GUI with soft keys, the soft keys can be presented in whole or in part at the remote controller while the rest of the GUI is presented at the media presentation device. In yet another illustrative embodiment in which a remote controller is not available, the GUI is wholly presented in the media presentation device (e.g., a laptop computer).

Upon reviewing the aforementioned embodiments, it would be evident to an artisan with ordinary skill in the art that said embodiments can be modified, reduced, or enhanced without departing from the scope and spirit of the claims described below. Other suitable modifications that can be applied to the present disclosure without departing from the scope of the claims below. Accordingly, the reader is directed to the claims section for a fuller understanding of the breadth and scope of the present disclosure.

Figure 8:
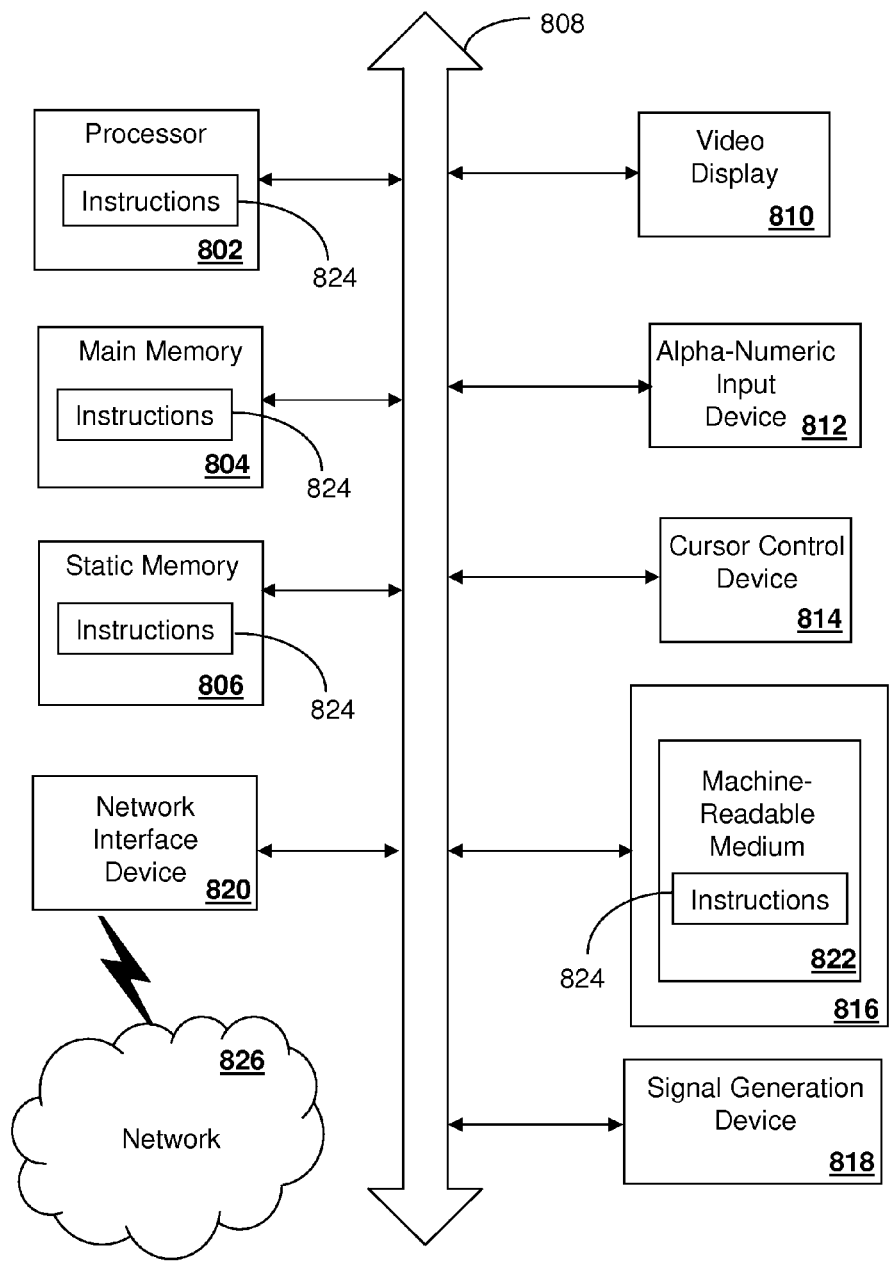
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set top box, comprising:
a memory to store computer instructions; and
a controller coupled with the memory, wherein the controller, responsive to executing the computer instructions, performs operations comprising:
recording soft key preferences associated with a user of the set top box for each of a plurality of media presentation states of a media communication system, wherein each of the plurality of media presentation states comprises a separate user interface for managing a corresponding one of an electronic programming guide, a video-on-demand catalog, a set top box help guide, a personal content library, and a web portal, and wherein the recording of the soft key preferences is based on user input indicating keys that have been determined to be likely to be utilized;
receiving a request for presentation of a graphical user interface associated with one of the plurality of media presentation states;
monitoring navigation activity at each separate user interface for the electronic programming guide, the video-on-demand catalog, the set top box help guide, and the web portal;
determining from the navigation activity a usage pattern by utilizing correlation pattern recognition that identifies combinations of key strokes to perform a plurality of functions;
selecting soft keys based on the usage pattern and according to the soft key preferences assigned to a requested media presentation state corresponding to the request for presentation, wherein each of the soft keys combines the plurality of functions associated with managing operations of the set top box;
presenting the soft keys in the graphical user interface, wherein a first portion of the graphical user interface is presented exclusively at a display device coupled with the set top box and a second portion of the graphical user interface is presented exclusively at a remote controller in communication with the set top box, wherein the remote controller manages operations of the set top box over a wireless interface, wherein the second portion of the graphical user interface presented at the remote controller displays the soft keys at a display of the remote controller, and wherein the first portion of the graphical user interface presented at the display device does not present the soft keys;
generating a modified second portion of the graphical user interface and displaying the modified second portion of the graphical user interface, wherein the generating of the modified second portion of the graphical user interface includes removing first and second soft keys of the soft keys and creating a third soft key with a combined functionality of the first and second soft keys, wherein the functionality of the first and second keys was included in the soft key preferences that was based on the user input.

2. The set top box of claim 1, wherein the operations further comprise:
- relocating to primary soft key positions, target soft keys identified by the soft key preferences for each of the plurality of media presentation states;
- relocating other soft keys not identified by the soft key preferences to secondary soft key positions, wherein the primary soft key positions are above the secondary soft key positions in graphical user interfaces presented by the set top box; and
- removing from the graphical user interfaces presented by the set top box some of the other soft keys not identified by the soft key preferences.

3. The set top box of claim 1, wherein the usage pattern defines a frequency of use of the soft keys and a contextual use of the soft keys and wherein the operations further comprise receiving additional user input that indicates a name for the third soft key and displaying the name, and wherein the second portion of the graphical user interface presented at a remote controller display comprises a purchase button that includes a combined functionality of buying a media service and confirming the buying of the media service in a single manipulation of the purchase button.

4. The set top box of claim 1, wherein the soft key preferences include an identification of keystrokes that are unlikely to be used in each of the plurality of media presentation states, wherein the soft keys are configured to be manipulated for managing a media program supplied by the media communication system and a menu of a digital video recorder, wherein the media communication system corresponds to an internet protocol television communication system, and wherein one of the soft keys enables purchasing selected media content and confirming a purchase of the selected media content in a single pressing of the one of the soft keys.

5. The set top box of claim 1, wherein the first soft key provides a first function for a user action, wherein the second soft key provides a second function for a confirmation of the user action, and wherein the operations further comprise receiving additional user input that indicates a name for the third soft key and displaying the name.

6. The set top box of claim 1, wherein the presenting of the soft keys in the graphical user interface is performed without allowing the user to delete any of the soft keys.

7. A computer-readable storage device comprising computer instructions which, responsive to being executed by a media processor, cause the media processor to perform operations comprising:
- receiving a request for presentation of a graphical user interface associated with one of a plurality of media presentation states of a media communication system, wherein each of the plurality of media presentation states comprises a separate user interface for managing a corresponding one of an electronic programming guide, a video-on-demand catalog, and a personal content library;
- selecting soft keys according to soft key preferences associated with a user of the media processor and assigned to a requested media presentation state corresponding to the request for presentation, wherein a portion of the soft keys combine a plurality of functions associated with managing operations of the media processor, wherein the selecting of the soft keys that combine the plurality of functions is based on identifying a usage pattern utilizing correlation pattern recognition that identifies combinations of key strokes to perform the plurality of functions;
- presenting the soft keys in the graphical user interface, wherein a first portion of the graphical user interface is presented exclusively at a display device coupled with the media processor and a second portion of the graphical user interface is presented exclusively at a remote controller in communication with the media processor, wherein the remote controller manages operations of the media processor over a wireless interface; and
- generating a modified second portion of the graphical user interface and displaying the modified second portion of the graphical user interface, wherein the generating of the modified second portion of the graphical user interface includes removing first and second soft keys of the soft keys and creating a third soft key with a combined functionality of the first and second soft keys, wherein the functionality of the first and second keys was included in the soft key preferences.

8. The computer-readable storage device of claim 7, wherein the media processor comprises a set top box, and wherein the media communication system comprises an internet protocol television communication system.

9. The computer-readable storage device of claim 7, wherein the operations further comprise presenting a customization graphical user interface to receive user input to define the soft key preferences for a requested media presentation state.

10. The computer-readable storage device of claim 7, wherein the operations further comprise defining soft key macros corresponding to the soft key preferences.

11. The computer-readable storage device of claim 7, wherein the operations further comprise:
- monitoring navigation activity associated with each of the plurality of media presentation states of the media communication system, wherein the navigation activity is at each separate user interface for the electronic programming guide and the video-on-demand catalog; and
- determining from the navigation activity the usage pattern.

12. The computer-readable storage device of claim 11, wherein the operations further comprise:
- relocating to primary soft key positions, target soft keys identified by the soft key preferences for each of the plurality of media presentation states;
- relocating other soft keys not identified by the soft key preferences to secondary soft key positions, wherein the primary soft key positions are above the secondary soft key positions in graphical user interfaces presented by the media processor; and
- removing from the graphical user interfaces presented by the media processor some of the other soft keys not identified by the soft key preferences.

13. The computer-readable storage device of claim 11, wherein the usage pattern defines a frequency of use of soft keys and a contextual use of soft keys.

14. The computer-readable storage device of claim 7, wherein the second portion of the graphical user interface presented at the remote controller displays the soft keys and the first portion of the graphical user interface presented at the display device does not present the soft keys.

15. The computer-readable storage device of claim 7, wherein the second portion of the graphical user interface presented at the remote controller displays a first portion of the soft keys and the first portion of the graphical user interface presented at the display device displays a second portion of the soft keys.

16. A remote controller that manages operations of a media processor, the remote controller comprising:
- a memory to store computer instructions; and a controller coupled with the memory, wherein the controller, responsive to executing the computer instructions, performs operations comprising:

selecting a first portion of soft keys selected according to soft key preferences associated with user input at the media processor and assigned to each of a plurality of media presentation states of a media communication system, wherein at least one of the soft keys combines a plurality of functions associated with managing operations of the media processor, wherein the selecting of the first portion of the soft keys is based on identifying a usage pattern utilizing correlation pattern recognition that identifies combinations of key strokes to perform the plurality of functions;

exclusively displaying the first portion of the soft keys, wherein a second portion of the soft keys is exclusively presented at a display device coupled with the media processor, wherein the controller manages the operations of the media processor over a wireless interface; and generating a modified first portion of the graphical user interface and displaying the modified first portion of the graphical user interface, wherein the generating of the modified first portion of the graphical user interface includes removing first and second soft keys of the soft keys and creating a third soft key with a combined functionality of the first and second soft keys, wherein the functionality of the first and second keys was included in the soft key preferences.

17. The remote controller of claim 16, wherein each of the plurality of media presentation states comprises a separate user interface for managing a corresponding one of an electronic programming guide, a video-on-demand catalog, a set top box help guide, and a web portal, and wherein the media processor comprises a set top box.

18. The remote controller of claim 16, wherein the operations further comprise:

monitoring navigation activity associated with each of the plurality of media presentation states of the media communication system, wherein the navigation activity is at each separate user interface for a electronic programming guide, a video-on-demand catalog, a set top box help guide, and a web portal; and determining from the navigation activity the usage pattern.

19. The remote controller of claim 18, wherein the usage pattern defines a frequency of use of the soft keys and a contextual use of the soft keys.

20. The remote controller of claim 16, wherein the operations further comprise receiving the first portion of the soft keys from the media processor over the wireless interface.

21. The remote controller of claim 20, wherein the wireless interface comprises a radio frequency communication medium.

\* \* \* \* \*